(12) United States Patent
Kao et al.

(10) Patent No.: US 11,409,160 B2
(45) Date of Patent: Aug. 9, 2022

(54) DISPLAY DEVICE

(71) Applicant: Innolux Corporation, Miao-Li County (TW)

(72) Inventors: Ker-Yih Kao, Miao-Li County (TW); Liang-Lu Chen, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 17/033,696

(22) Filed: Sep. 26, 2020

(65) Prior Publication Data
US 2021/0116749 A1 Apr. 22, 2021

Related U.S. Application Data

(60) Provisional application No. 62/916,872, filed on Oct. 18, 2019.

(30) Foreign Application Priority Data

Jul. 30, 2020 (CN) .......................... 202010748661.8

(51) Int. Cl.
| | | |
|---|---|---|
| *G09G 3/34* | (2006.01) | |
| *G02F 1/13357* | (2006.01) | |
| *G02F 1/1335* | (2006.01) | |
| *G02F 1/1343* | (2006.01) | |

(52) U.S. Cl.
CPC ..... *G02F 1/133602* (2013.01); *G09G 3/3426* (2013.01); *G02F 1/1343* (2013.01); *G02F 1/133603* (2013.01); *G02F 1/133612* (2021.01); *G09G 2300/0426* (2013.01); *G09G 2320/0233* (2013.01)

(58) Field of Classification Search
CPC ......... G02F 1/133602; G02F 1/133612; G02F 1/133603; G02F 1/1343; G09G 3/3426; G09G 2320/0233; G09G 2300/0426
See application file for complete search history.

(56) References Cited

U.S. PATENT DOCUMENTS

| | | | | |
|---|---|---|---|---|
| 2007/0002590 | A1* | 1/2007 | Jang ................... | G02F 1/133603 362/633 |
| 2007/0057251 | A1* | 3/2007 | Wang ................... | H01L 27/3244 257/40 |
| 2008/0123004 | A1* | 5/2008 | Lin ........................... | G09G 3/20 349/40 |
| 2010/0134406 | A1* | 6/2010 | Maruyama ........... | G09G 3/3426 345/102 |
| 2010/0265432 | A1 | 10/2010 | Masuda et al. | |
| 2011/0248978 | A1* | 10/2011 | Koyama .............. | G09G 3/3696 345/211 |

(Continued)

*Primary Examiner* — Towfiq Elahi
(74) *Attorney, Agent, or Firm* — JCIPRNET (57) ABSTRACT

The disclosure provides a display device including a liquid crystal panel and a plurality of backlight units. The plurality of backlight units are configured to provide light to the liquid crystal panel. Each of the backlight units includes a driving substrate and a light-emitting element disposed on the driving substrate. The driving substrate includes a data line, a scanning line, and a driving circuit including three nodes. The three nodes of the driving circuit are respectively electrically connected to the data line, the scanning line, and the light-emitting element. The display device of the disclosure may have a relatively large size.

17 Claims, 6 Drawing Sheets

(56) References Cited

U.S. PATENT DOCUMENTS

| | | | |
|---|---|---|---|
| 2012/0002133 A1* | 1/2012 | Yamazaki | G09G 3/342 |
| | | | 349/61 |
| 2013/0328052 A1* | 12/2013 | Kuo | H01L 28/86 |
| | | | 257/59 |
| 2016/0035749 A1* | 2/2016 | Kang | G09G 3/3677 |
| | | | 257/59 |
| 2016/0086546 A1* | 3/2016 | Noh | G09G 3/3258 |
| | | | 345/80 |
| 2018/0137826 A1* | 5/2018 | Jang | G09G 3/36 |
| 2020/0090608 A1* | 3/2020 | Calayir | G09G 3/3648 |
| 2021/0003891 A1* | 1/2021 | Seo | G02F 1/133605 |

* cited by examiner

DISPLAY DEVICE

CROSS-REFERENCE TO RELATED APPLICATION

This application claims the priority benefits of U.S. provisional application Ser. No. 62/916,872, filed on Oct. 18, 2019, and China application serial no. 202010748661.8, filed on Jul. 30, 2020. The entirety of each of the above-mentioned patent applications is hereby incorporated by reference herein and made a part of this specification.

BACKGROUND OF THE DISCLOSURE

1. Field of the Disclosure

The disclosure relates to a display device, and in particular, to a display device that may have a relatively large size.

2. Description of Related Art

A display panel is widely applied to an electronic apparatus such as a mobile phone, a television, a monitor, a tablet computer, an automobile display, a wearable device, and a desktop computer. With the vigorous development of the electronic product, there are increasingly higher requirements for display quality of the electronic product, so that an electronic device for display is continuously improved to finally achieve a display effect with greater or higher resolution.

SUMMARY OF THE DISCLOSURE

The disclosure provides a display device that may have a relatively large size, for example, the size may be greater than 70 inches, but is not limited thereto.

According to an embodiment of the disclosure, the display device includes a liquid crystal panel and a plurality of backlight units. The plurality of backlight units are configured to provide light to the liquid crystal panel. Each of the backlight units includes a driving substrate and a light-emitting element disposed on the driving substrate. The driving substrate includes a data line, a scanning line, and a driving circuit including three nodes. The three nodes of the driving circuit are respectively electrically connected to the data line, the scanning line, and the light-emitting element.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The disclosure may be understood with reference to the following detailed description and the accompanying drawings. It should be noted that, for ease of understanding by readers and concise drawings, a plurality of drawings in the disclosure merely show a part of an electronic device, and specific elements in the drawings are not drawn to scale. In addition, the quantity and size of the elements in the drawings are merely exemplary, and are not intended to limit the scope of the disclosure.

In this specification and the claims, words such as "have", "include" and "comprise" are open words, and should be interpreted as "including, but not limited to".

It should be understood that, when an element or a film is referred to as being "on" another element or film or "connected to" another element or film, the element or film may be directly on the another element or film or directly connected to the another element or film, or there are elements or films inserted between the two elements or films (indirectly). Conversely, when an element is referred to as being "directly on" another element or film or "directly connected to" another element or film, there is no element or film inserted between the two elements or films.

Although terms such as first, second, and third may be used to describe a plurality of components, the components are not be limited to the terms. The terms are merely used for distinguishing a single component and another component in the specification. In the claims, same terms may not be used, but terms such as first, second, and third are used according to a described order of the components in the claims. Therefore, in the specification, a first component may be a second component in the claims.

In some embodiments of the disclosure, terms such as "connect" and "interconnect" with regard to bonding and connection, unless specifically defined, may mean that two structures are in direct contact, or may mean that two structures are not in direct contact, and there is another structure between the two structures. The terms with regard to bonding and connection may also include a case where both structures are movable or both structures are fixed. In addition, the term "coupling" includes any direct and indirect means of electrical connection.

In the disclosure, a length and a width may be measured by using an optical microscope, and a thickness may be measured through a cross-sectional image in an electron microscope, but are not limited thereto. In addition, there may be a certain error between any two values or directions for comparison.

The electronic device of the disclosure may include a display device, an antenna device, a sensing device, a touch electronic device (touch display), a curved electronic device (a curved display), or a non-rectangular electronic device (free shape display), but is not limited to thereto. The electronic device may be a bendable or flexible electronic device. The electronic device may include, for example, a light-emitting diode, liquid crystal, fluorescence, phosphor, other suitable display media, or a combination thereof, but is not limited thereto. The light-emitting diode (LED) may include, for example, an organic light-emitting diode (OLED), an inorganic light-emitting diode, a sub-millimeter light-emitting diode (mini LED), a micro LED, or a quantum dot (QD, such as QLED, QDLED), or other suitable materials or any combination thereof, but is not limited thereto.

The display device may include, for example, a tiled display device, but is not limited to thereto. The antenna device may be, for example, a liquid crystal antenna, but is not limited thereto. The antenna device may include, for example, an antenna tiling device, but is not limited thereto. It should be noted that the electronic device may be any combination of the foregoing, but is not limited thereto. In addition, a shape of the electronic device may be a rectangle, a circle, a polygon, a shape with curved edges, or other suitable shapes. The electronic device may have a peripheral system such as a driving system, a control system, a light source system, a shelf system, etc., to support a display device, an antenna device, or a tiled device. Content of the disclosure is explained below by using a display device, but the disclosure is not limited thereto.

It should be understood that for the following listed embodiments, features in several different embodiments may be replaced, recombined, or mixed to implement other embodiments without departing from the spirit of the disclosure. All features in the embodiments may be arbitrarily mixed and matched provided that they do not depart from the spirit of disclosure or conflict with each other.

References will now be made in detail to exemplary embodiments of the disclosure, and examples of the exemplary embodiments will be described in the accompanying drawings. Whenever possible, the same component symbols are used in the drawings and descriptions to indicate the same or similar parts.

Figure 1A:
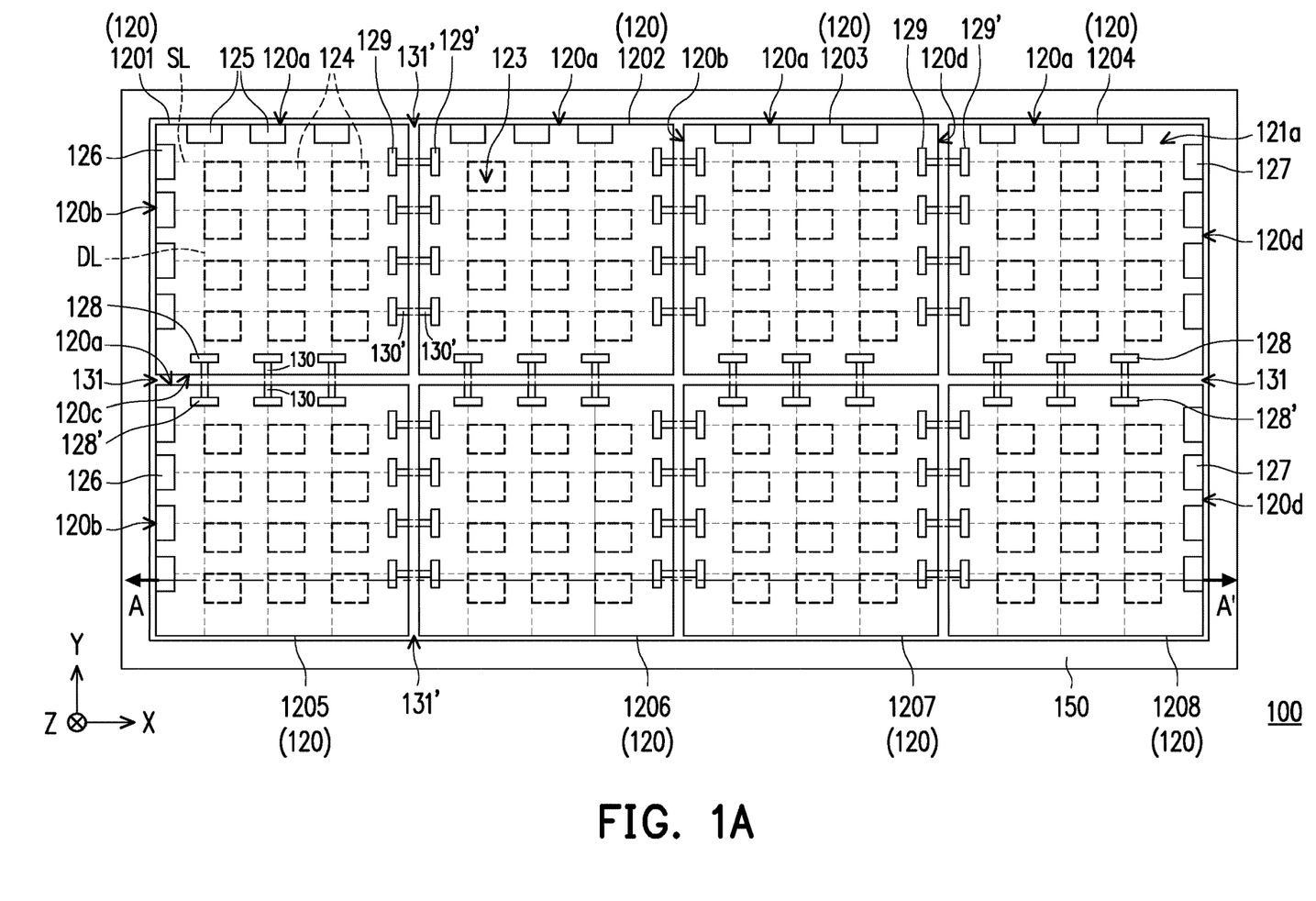
FIG. 1A is a schematic top view of a display device according to an embodiment of the disclosure.
Figure 1B:
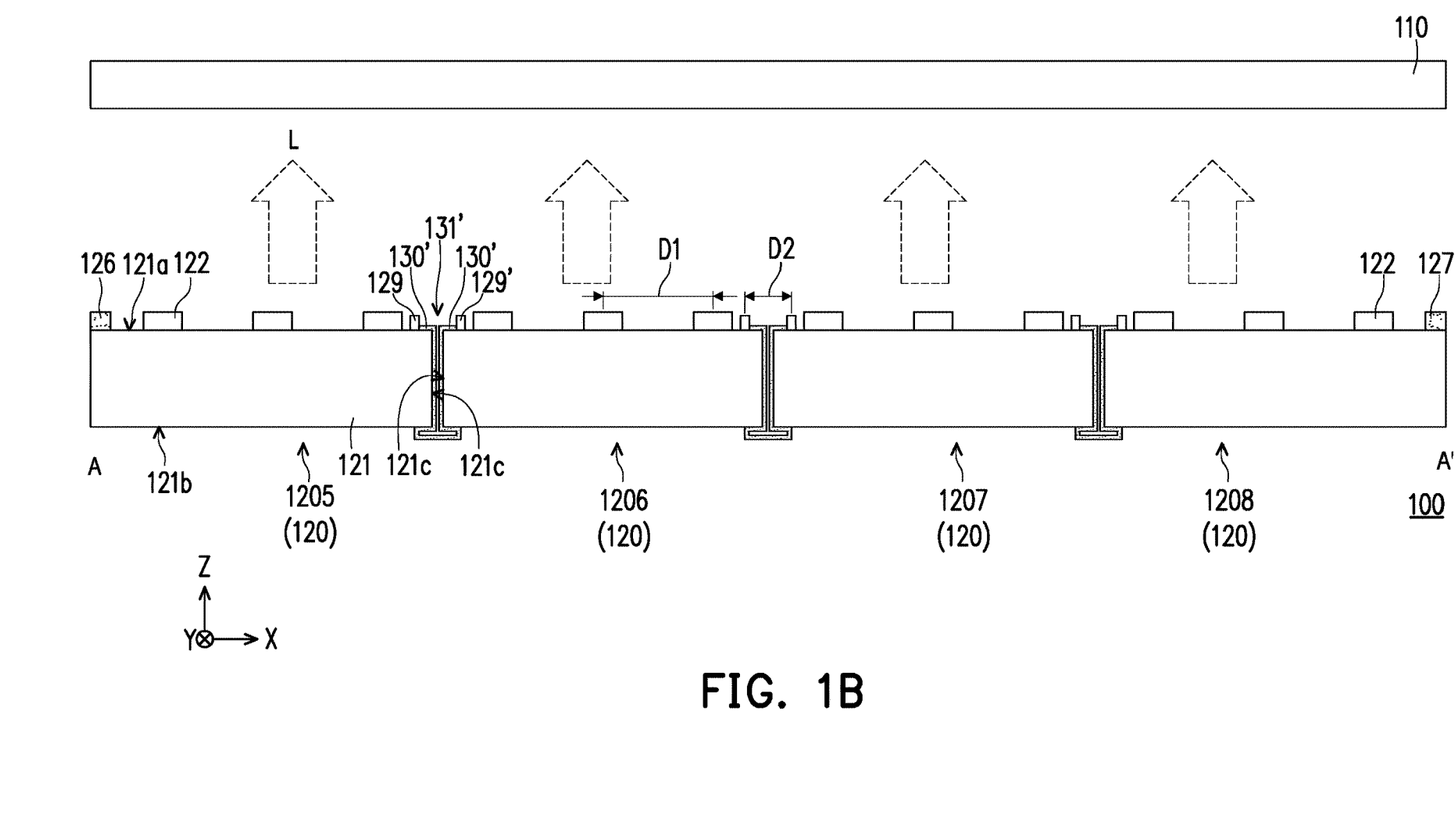
FIG. 1B is a schematic cross-sectional view of the display device of FIG. 1A along a section line A-A'.
Figure 1C:
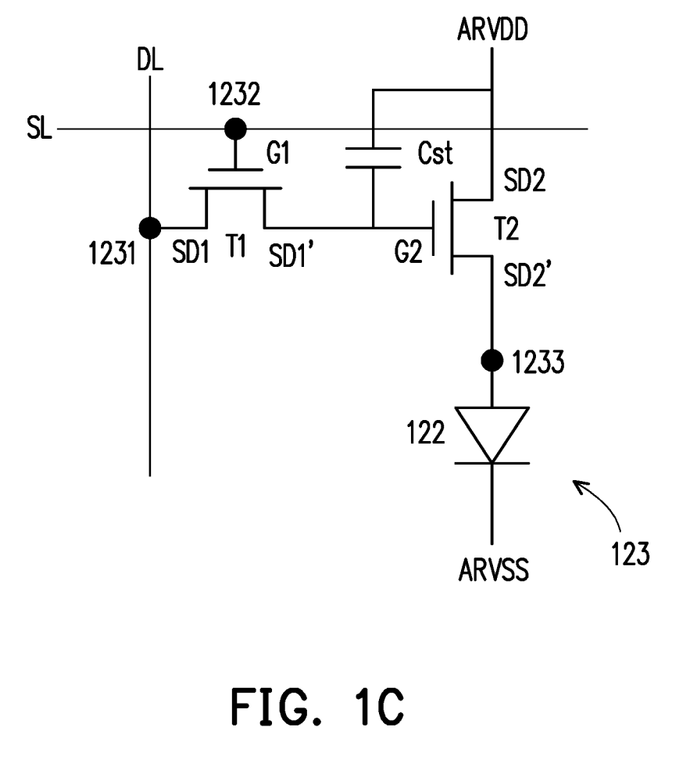
FIG. 1C is a schematic circuit diagram of a driving circuit in a light-emitting unit of the display device of FIG. 1A.

FIG. 1A is a schematic top view of a display device according to an embodiment of the disclosure. FIG. 1B is a schematic cross-sectional view of the display device of FIG. 1A along a section line A-A'. FIG. 1C is a schematic circuit diagram of a driving circuit in a light-emitting unit of the display device of FIG. 1A. For clearly and conveniently describing the drawings, FIG. 1A omits several elements in a liquid crystal panel 110 and a display device 100.

Referring to both FIG. 1A and FIG. 1B, the display device 100 of the embodiment includes the liquid crystal panel 110, a plurality of backlight units 120, and an outer frame 150. The plurality of backlight units 120 may be configured to provide light L to the liquid crystal panel 110, and the outer frame 150 may be configured to protect the panel 110. In the embodiment, the panel may be a liquid crystal panel, and the liquid crystal panel 110 may include a rigid substrate or a flexible substrate. For example, a material of the liquid crystal panel 110 may include glass, quartz, sapphire, ceramics, polycarbonate (PC), polyimide (PI), polyethylene terephthalate (PET), other suitable substrate materials, or a combination of the foregoing, but is not limited thereto. In the embodiment, the liquid crystal panel 110 further includes liquid crystal (not shown), so that the display device 100 may present a picture.

In the embodiment, the plurality of backlight units 120 may be disposed under the liquid crystal panel 110, so that light L emitted by the plurality of backlight units 120 may be emitted toward a direction of the liquid crystal panel 110. The light L may include white light, red light, green light, or blue light, but is not limited thereto. In detail, in the schematic top view (as shown in FIG. 1A) of the embodiment, the plurality of backlight units 120 may include eight backlight units 1201, 1202, 1203, 1204, 1205, 1206, 1207, and 1208. The backlight units 1201, 1202, 1203, 1204, 1205, 1206, 1207, and 1208, for example, are arranged in a 2×4 matrix, and arranged in a horizontal tiling direction and a vertical tiling direction, but is not limited to thereto. In the embodiment, the backlight units 1201, 1202, 1203, and 1204 are sequentially arranged along a direction X (that is, a direction in which a scanning line SL extends) and tiled on an upper side of the matrix, and the backlight units 1205, 1206, 1207, 1208 are arranged along the direction X in sequence and tiled on a lower side of the matrix. The backlight units 1201, 1205 are located on the leftmost side of the matrix, and the backlight units 1204, 1208 are located on the rightmost side of the matrix. The backlight unit 1201 is tiled corresponds to the backlight unit 1205, the backlight unit 1202 is tiled corresponding to the backlight unit 1206, the backlight unit 1203 is tiled corresponding to the backlight unit 1207, and the backlight unit 1204 is tiled corresponding to the backlight unit 1208.

Still referring to FIG. 1A, FIG. 1B, and FIG. 1C, in the embodiment, each of the backlight units 1201, 1202, 1203, 1204, 1205, 1206, 1207, and 1208 may include a driving substrate 121 and a light-emitting element 122 disposed on the driving substrate 121. The driving substrate 121 has a first surface 121a and a second surface 121b opposite to the first surface 121a. The driving substrate 121 includes a data line DL, a scanning line SL, and a driving circuit 123 including three nodes 1231, 1232, 1233. In detail, a direction in which the scanning line SL extends is the direction X, a direction in which the data line DL extends is a direction Y, and a normal direction of the liquid crystal panel 110 is a direction Z. The directions X, Y, and Z are different from each other, and the directions X, Y, and Z may be substantially perpendicular to each other. A plurality of light-emitting units 124 may be defined by arrangement of the data line DL and the scanning line SL. In some embodiments, the data line DL and the scanning line SL may be produced in a same layer. In some other embodiments, the data line DL and the scanning line SL may be produced in different layers. In some embodiments, the data line DL and the scanning line SL may be stacked and arranged in a manner according to product design requirements, but is not limited thereto. In the embodiment, the driving substrate 121 may further include a rigid substrate or a flexible substrate. For example, a material of the driving substrate 121 may include glass, quartz, sapphire, ceramics, polycarbonate (PC), polyimide (PI), polyethylene terephthalate (Polyethylene terephthalate, PET), other suitable substrate materials, or a combination of the foregoing, but is not limited thereto. In addition, the driving circuit 123 may further include more than three nodes. In other words, a number of nodes may be determined according to circuit design, but is not limited to thereto.

The plurality of backlight units 120 further include a plurality of data driving ICs 125, a plurality of scan driving ICs 126, 127, and a plurality of pads 128, 128', 129, 129'. The data driving ICs 125, the scan driving ICs 126, 127, and the pads 128, 128', 129, 129' are respectively disposed on the first surface 121a of the driving substrate 121. In detail, in the schematic top view (as shown in FIG. 1A) of the embodiment, the data driving ICs 125 may be disposed on at least one of the plurality of backlight units, for example, the data driving ICs 125 may be disposed on an upper side 120a of the uppermost backlight units 1201, 1202, 1203, 1204 among the plurality of backlight units 120 (that is, disposed on a side of the backlight units 1201, 1202, 1203, 1204 away from the backlight units 1205, 1206, 1207, 1208) and is arranged along a direction in which the scanning line SL is arranged, but is not limited thereto. The scan driving ICs 126 are disposed on at least one of the plurality of backlight units, for example, the scan driving ICs 126 may be disposed on a left side 120b of the leftmost backlight units 1201, 1205 among the plurality of backlight units 120 (that is, disposed on a side of the backlight units 1201, 1205 away from the backlight units 1202, 1206) and arranged along a direction in which the data line DL extends, and the scan driving ICs 127 may be disposed on a right side 120*d* of the rightmost backlight units 1204, 1208 among the plurality of backlight units 120 (that is, disposed on a side of the backlight units 1204 and 1208 away from the backlight units 1203 and 1207) and arranged along a direction in which the data line DL extends. The pad 128 is disposed on a lower side 120*c* of the backlight units 1201, 1202, 1203, 1204 (that is, disposed on a side of the backlight units 1201, 1202, 1203, 1204 adjacent to the backlight units 1205, 1206, 1207, 1208) and arranged along the direction X, the pad 128' may be disposed on an upper side 120*a* of the backlight units 1205, 1206, 1207, 1208 (that is, disposed on a side of the backlight units 1205, 1206, 1207, 1208 adjacent to the backlight units 1201, 1202, 1203, 1204) and arranged along the direction X. The pad 129 is disposed on a right side 120*d* of the backlight units 1201, 1202, 1203, 1205, 1206, 1207 and arranged along the direction Y. The pad 129' may be disposed on a left side 120*b* of the backlight units 1202, 1203, 1204, 1206, 1207, 1208 and arranged along the direction Y.

Although in the schematic top view of the display device 100 of the embodiment, the plurality of backlight units 120 may include eight backlight units 1201, 1202, 1203, 1204, 1205, 1206, 1207, 1208, and the eight backlight units 1201, 1202, 1203, 1204, 1205, 1206, 1207, 1208, for example, are arranged in a 2×4 matrix, and the eight backlight units 1201, 1202, 1203, 1204, 1205, 1206, 1207, and 1208 are tiled together in a horizontal tiling direction and a vertical tiling direction, the disclosure does not limit a number, a shape, an arrangement manner, and a tiling manner of the plurality of backlight units 120. In other words, in some embodiments, the number of the plurality of backlight units 120 may further be less than eight or greater than eight. In some embodiments, the plurality of backlight units 120 may further be arranged and tiled in different matrixes, such as a 1×6, 3×4, or 9×16 matrix, but is not limited thereto.

In the embodiment, each data driving IC 125 may be electrically connected to at least one corresponding data line DL (FIG. 1A schematically shows that each data driving IC 125 may be electrically connected to one data line DL, but is not limited thereto), so that a voltage of each data driving IC 125 may be input to the light-emitting unit 124 through the corresponding data line DL. Each of the scan driving ICs 126, 127 may be electrically connected to at least one corresponding scanning line SL (FIG. 1A schematically shows that each of the scan driving ICs 126, 127 may be electrically connected to one scanning line SL, but is not limited thereto), so that a voltage of each of the scan driving ICs 126, 127 may be input to the light-emitting unit 124 through the corresponding scanning line SL.

Referring to both FIG. 1A and FIG. 1C, in the embodiment, the driving circuit 123 of the driving substrate 121 is disposed in the light-emitting unit 124. The driving circuit 123 may include transistors T1, T2, a capacitor Cst, a high power supply voltage ARVDD (for example, a power line, but not limited thereto), a low power supply voltage ARVSS (for example, a grounding line, but not limited thereto), and three nodes 1231, 1232, 1233, but is not limited thereto. The three nodes 1231, 1232, and 1233 of the driving circuit 123 are respectively electrically connected to the data line DL, the scanning line SL, and the light-emitting element 122. In detail, a voltage input to the scanning line SL from the scan driving ICs 126 and 127 may be input to a gate G1 of a transistor T1 through the node 1232 of the driving circuit 123 to turn on the transistor T1. When the transistor T1 is turned on, a voltage input to the data line DL from the data driving IC 125 may be input to a source SD1 of the transistor T1 through the node 1231 of the driving circuit 123 and input to a gate G2 of the transistor T2 through a drain SDP to turn on the transistor T2. When the transistor T2 is turned on, a high power supply voltage ARVDD may be input to the light-emitting element 122 through a source SD2 and a drain SD2' of the transistor T2, and the node 1233 to drive the light-emitting element 122 to emit light L.

Still referring to both FIG. 1A and FIG. 1B, in the embodiment, the two backlight units 1201 and 1205 (or backlight units 1202 and 1206, backlight units 1203 and 1207, or backlight units 1204 and 1208) are adjacent to each other, and data lines DL of the two backlight units 1201 and 1205 (or backlight units 1202 and 1206, backlight units 1203 and 1207, or backlight units 1204 and 1208) may be electrically connected to each other. In detail, a flexible flat cable (FFC) 130 may be disposed in a tiling area 131 between the backlight unit 1201 and the backlight unit 1205 (or between the backlight unit 1202 and the backlight unit 1206, between the backlight unit 1203 and the backlight unit 1207, or between the backlight unit 1204 and the backlight unit 1208), and two ends of the flexible flat cable 130 are respectively engaged with the pads 128 of the backlight units 1201, 1202, 1203, 1204 and the pads 128' of the backlight units 1205, 1206, 1207, 1208, so that data lines DL of the two backlight units 1201 and 1205 (or backlight units 1202 and 1206, backlight units 1203 and 1207, or backlight units 1204 and 1208) may be electrically connected to each other through the flexible flat cable 130. In other words, by connecting two ends of the data line DL in the backlight unit 1201 (or backlight units 1202, 1203, or 1204) to the data driving IC 125 and the pad 128 respectively, a voltage of the data driving IC 125 in the backlight unit 1201 may be input to an adjacent backlight unit 1205 through a data line DL and the pad 128 of the backlight unit, and the flexible flat cable 130, providing a voltage to the backlight unit 1205 (or backlight units 1206, 1207, 1208) that is not provided with the data driving IC 125.

Although the display device 100 of the embodiment uses the flexible flat cable 130 to electrically connect the data lines DL of the adjacent backlight units 1201 and 1205 (or backlight units 1202 and 1206, backlight units 1203 and 1207, or backlight units 1204 and 1208), but is not limited thereto. In other words, in some embodiments, a flexible printed circuit (FPC) may further be used instead of the flexible flat cable 130 to electrically connect the data lines DL of the adjacent backlight units 1201 and 1205 (or backlight units 1202 and 1206, backlight units 1203 and 1207, or backlight units 1204 and 1208).

In addition, in the embodiment, the two backlight units 1201 and 1202 (or backlight units 1202 and 1203, backlight units 1203 and 1204, backlight units 1205 and 1206, backlight units 1206 and 1207, or backlight units 1207 and 1208) are adjacent to each other, and scanning lines SL of the two backlight units 1201 and 1202 (or backlight units 1202 and 1203, backlight units 1203 and 1204, backlight units 1205 and 1206, backlight units 1206 and 1207, backlight units 1207 and 1208) may be electrically connected to each other. In detail, a flexible flat cable 130' may be disposed in a tiling area 131' between the backlight unit 1201 and the backlight unit 1202 (or between the backlight unit 1202 and the backlight unit 1203, between the backlight unit 1203 and the backlight unit 1204, between the backlight unit 1205 and the backlight unit 1206, between the backlight unit 1206 and the backlight unit 1207, or between the backlight unit 1207 and the backlight unit 1208), and two ends of the flexible flat cable 130' are respectively engaged with the pads 129 of the backlight units 1201, 1202, 1203, 1205, 1206, 1207 and the pads 129' of the backlight units 1202, 1203, 1204, 1206, 1207, 1208, so that scanning lines of the two backlight units 1201 and 1202 (or backlight units 1202 and 1203, backlight units 1203 and 1204, backlight units 1205 and 1206, backlight units 1206 and 1207, backlight units 1207 and 1208) may be electrically connected to each other through the flexible flat cable 130'. In other words, by connecting two ends of the scanning line SL in the backlight unit 1201 to the scan driving IC 126 and the pad 129, a voltage of the scan driving IC 126 on the backlight unit 1201 may be input to an adjacent backlight unit 1202 through the scanning line SL and the pad 129 of the backlight unit, and a flexible flat cable 130'. Next, a voltage input to the backlight unit 1202 is input to the adjacent backlight unit 1203 through a pad 129', a scanning line SL, and a pad 129 of the backlight unit, and the flexible flat cable 130'. In this way, the voltage of the scan driving IC 126 may be transmitted from the backlight unit 1201 to the backlight unit 1204, and may be provided to the backlight units 1202, 1203, 1204, especially to the backlight units 1202, 1203 not provided with the scan driving ICs 126, 127 to drive a light-emitting element 122 of the backlight units.

Similarly, by respectively connecting two ends of the scanning line SL in the backlight unit 1204 to the scan driving IC 127 and the pad 129', a voltage of the scan driving IC 127 on the backlight unit 1204 may be input to an adjacent backlight unit 1203 through the scanning line SL and the pad 129 of the backlight unit, and the flexible flat cable 130'. Next, a voltage input to the backlight unit 1203 is input to an adjacent backlight unit 1202 through the pad 129 the scanning line SL and a pad 129' of the backlight unit and the flexible flat cable 130'. In this way, the voltage of the scan driving IC 127 may be transmitted from the backlight unit 1204 to the backlight unit 1201, and may be provided to the backlight units 1201, 1202, 1203, especially to the backlight units 1202, 1203 not provided with the scan driving ICs 126, 127 to drive a light-emitting element 122 of the backlight units.

In some embodiments, the scan driving IC 126 and the scan driving IC 127 may respectively transmit a signal from the backlight unit 1201 to the backlight unit 1204 or from the backlight unit 1204 to the backlight unit 1201 in different time sequences. For example, in a first time sequence, the scan driving IC 126 transmits the signal from the backlight unit 1201 to the backlight unit 1204. In a second time sequence, the scan driving IC 127 transmits the signal from the backlight unit 1204 to the backlight unit 1201. In some other embodiments, in a same time sequence, the scan driving IC 126 may transmit the signal to the backlight unit 1201 and the backlight unit 1202, and the scan driving IC 127 may transmit the signal to the backlight unit 1203 and the backlight unit 1204, but is not limited thereto.

In some other embodiments, one of the scan driving IC 126 and the scan driving IC 127 may be selected, but is not limited thereto.

Although the display device 100 of the embodiment uses the flexible flat cable 130' to electrically connect scanning lines SL of the adjacent backlight units 1201 and 1202 (or backlight units 1202 and 1203, backlight units 1203 and 1204, backlight units 1205 and 1206, backlight units 1206 and backlight units 1207, or 1207 and 1208), but is not limited thereto. In other words, in some embodiments, a flexible printed circuit board may further be used to replace the flexible flat cable 130' to electrically connect scanning lines SL of the adjacent backlight units 1201 and 1202 (or backlight units 1202 and 1203, backlight units 1203 and 1204, backlight units 1205 and 1206, backlight units 1206 and 1207, or backlight units 1207 and 1208).

In the embodiment, the flexible flat cable 130' may be disposed on the first surface 121a of the driving substrate 121, and extend along a side surface 121c of the driving substrate 121 in a tiling area 131' to a second surface 121b of the driving substrate 121, and then extend along a second surface 121b of the other adjacent driving substrate 121 and the other side surface 121c of the tiling area 131' to a first surface 121a of the other adjacent driving substrate 121, but is not limited thereto. In some embodiments, the flexible flat cable (not shown) may further be disposed on the first surface 121a of the driving substrate 121, and extend to the side surface 121c of the driving substrate 121 in the tiling area 131', and then extend along the other side surface 121c in the tiling area 131 to the first surface 121a of another adjacent driving substrate 121, but is not limited thereto. In some embodiments, the flexible flat cable (not shown) may further be disposed on the first surface 121a of the driving substrate 121, and extend across the tiling area 131 to the first surface 121a of another adjacent driving substrate 121. In some embodiments, the flexible flat cable (not shown) may further be disposed on the second surface 121b of the driving substrate 121, and extend across the tiling area 131' to the second surface 121b of another adjacent driving substrate 121, but is not limited thereto. In addition, in some embodiments, the flexible flat cable 130' may be in contact with the second surface 121b of the driving substrate 121, but is not limited thereto. The flexible flat cable 130 may be disposed with reference to the foregoing description, and the descriptions thereof are omitted herein.

In the embodiment, the light-emitting element 122 may include light-emitting diodes (LEDs) of different colors, such as a red LED, a green LED, a blue LED, and/or a white LED, but is not limited thereto. The light-emitting element 122 may further include a blue LED or an ultraviolet LED (UV LED) matched with a light conversion material. The light conversion material may include, for example, quantum dots, fluorescence, phosphorescence, other suitable materials, or a combination of the foregoing, but is not limited thereto. In the embodiment, a distance D1 between adjacent light-emitting elements 122 may be greater than or equal to a distance D2 of the tiling areas 131 and 131'. The distance D2 of the tiling area 131' may be regarded as a shortest distance between a midpoint of a maximum width of the pad 129 of the backlight unit 1201 and a midpoint of a maximum width of the pad 129' of the backlight unit 1202 (or between a midpoint of a maximum width of a pad 129 of the backlight unit 1202 and a midpoint of a maximum width of a pad 129' of the backlight unit 1203, between a midpoint of a maximum width of a pad 129 of the backlight unit 1203 and a midpoint of a maximum width of a pad 129' of the backlight unit 1204, between a midpoint of a maximum width of a pad 129 of the backlight unit 1205 and a midpoint of a maximum width of a pad 129' of the backlight unit 1206, between a midpoint of a maximum width of a pad 129 of the backlight unit 1206 and a midpoint of a maximum width of a pad 129' of the backlight unit 1207, and between a midpoint of a maximum width of a pad 129 of the backlight unit 1207 and a midpoint of a maximum width of a pad 129' of the backlight unit 1208). The distance D2 of the tiling area 131 may be regarded as a shortest distance between a midpoint of a maximum width of the pad 128 of the backlight unit 1201 and a midpoint of a maximum width of the pad 128' of the backlight unit 1205 (or between a midpoint of a maximum width of a pad 128 of the backlight unit 1202 and a midpoint of a maximum width of a pad 128' of the backlight unit 1206, between a midpoint of a maximum width of a pad 128 of the backlight unit 1203 and a midpoint of a maximum width of a pad 128' of the backlight unit 1207, or between a midpoint of a maximum width of a pad 128 of the backlight unit 1204 and a midpoint of a maximum width of a pad 128' of the backlight unit 1208). In addition, in some embodiments, a distance D1 between adjacent light-emitting elements 122 is, for example, less than 1 millimeter (mm), less than 0.9 millimeters (mm), less than 0.8 millimeters (mm), less than 0.8 millimeters (mm), less than 0.7 millimeters (mm), but is not limited thereto. In some embodiments, the distance D1 between adjacent light-emitting elements 122 may further be, for example, less than 0.625 mm.

In addition, in the display device 100 of the embodiment, because the backlight units 1202, 1203 (or backlight units 1206, 1207) may use the scan driving ICs 126, 127 disposed on the backlight units 1201, 1204 (or backlight units 1205, 1208) or dispose the flexible flat cable 130' to drive the light-emitting element 122 of the backlight units to emit light. Therefore, there is no need to additionally dispose the scan driving ICs 126, 127 on the backlight units 1202, 1203 (or backlight units 1206, 1207), thereby reducing costs for manufacturing the display device 100 of the embodiment.

In short, in the display device 100 of the embodiment, a plurality of backlight units 120 are tiled together in a horizontal tiling direction and/or a vertical tiling direction, and sizes of the plurality of tiled backlight units 120 correspond to a size of the liquid crystal panel 110 or the display device 100, so that the plurality of tiled backlight units 120 may provide light L to the liquid crystal panel 110 or the display device 100. Therefore, compared to that a size of a conventional display device is limited by a size of a single backlight unit, the display device 100 of this embodiment of the disclosure may have a relatively large size, for example, the size may be greater than 70 inches, but is not limited thereto.

Other embodiments are listed below for description. It should be noted herein that in the following embodiments, reference numerals and some content of the foregoing embodiments are used, and same reference numerals are used to represent same or similar elements, and descriptions about same technical content are omitted. Reference may be made to the foregoing embodiments for the omitted portion, and the descriptions thereof are omitted in the following embodiments.

Figure 2A:
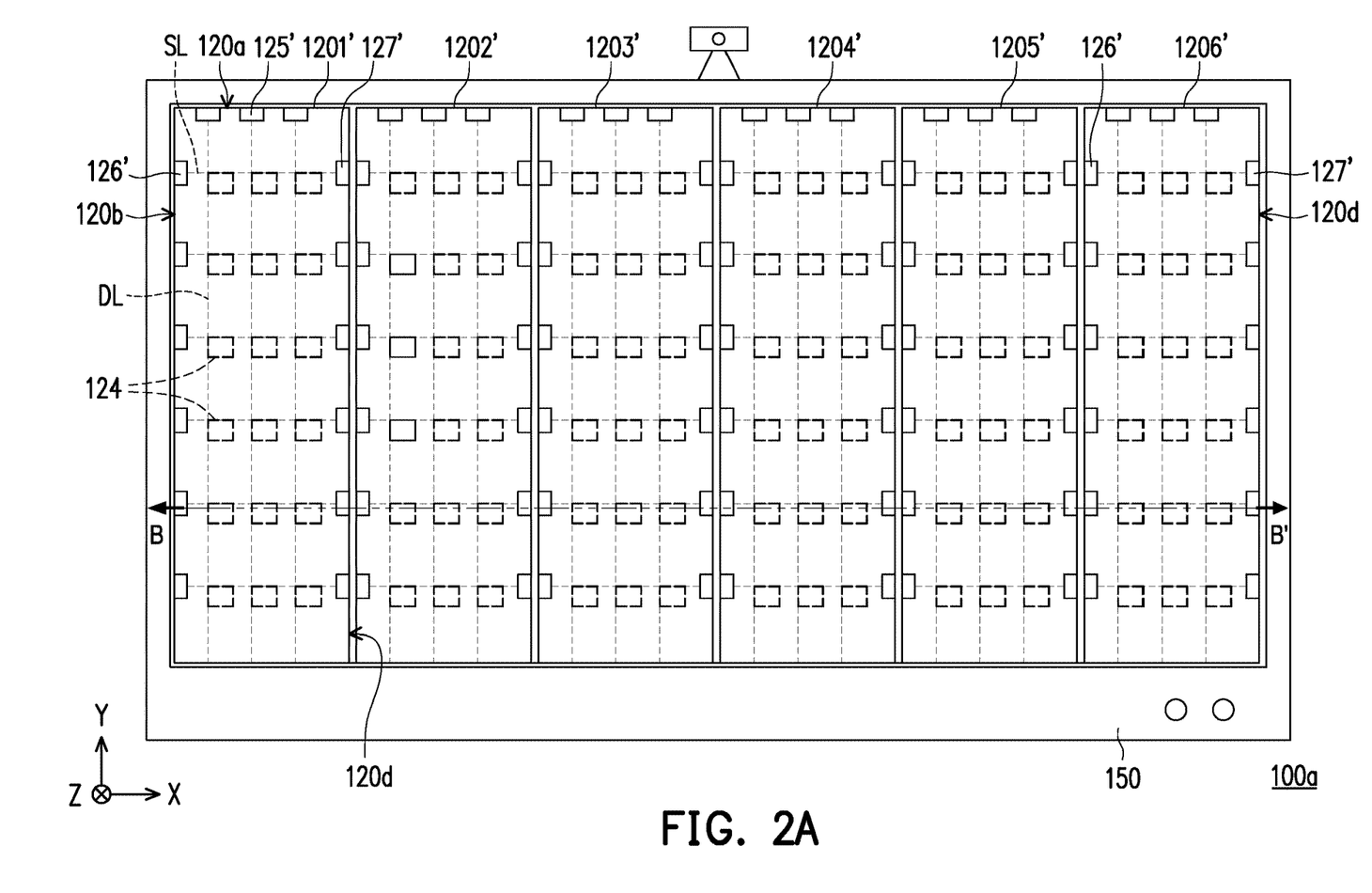
FIG. 2A is a schematic top view of a display device according to another embodiment of the disclosure.
Figure 2B:
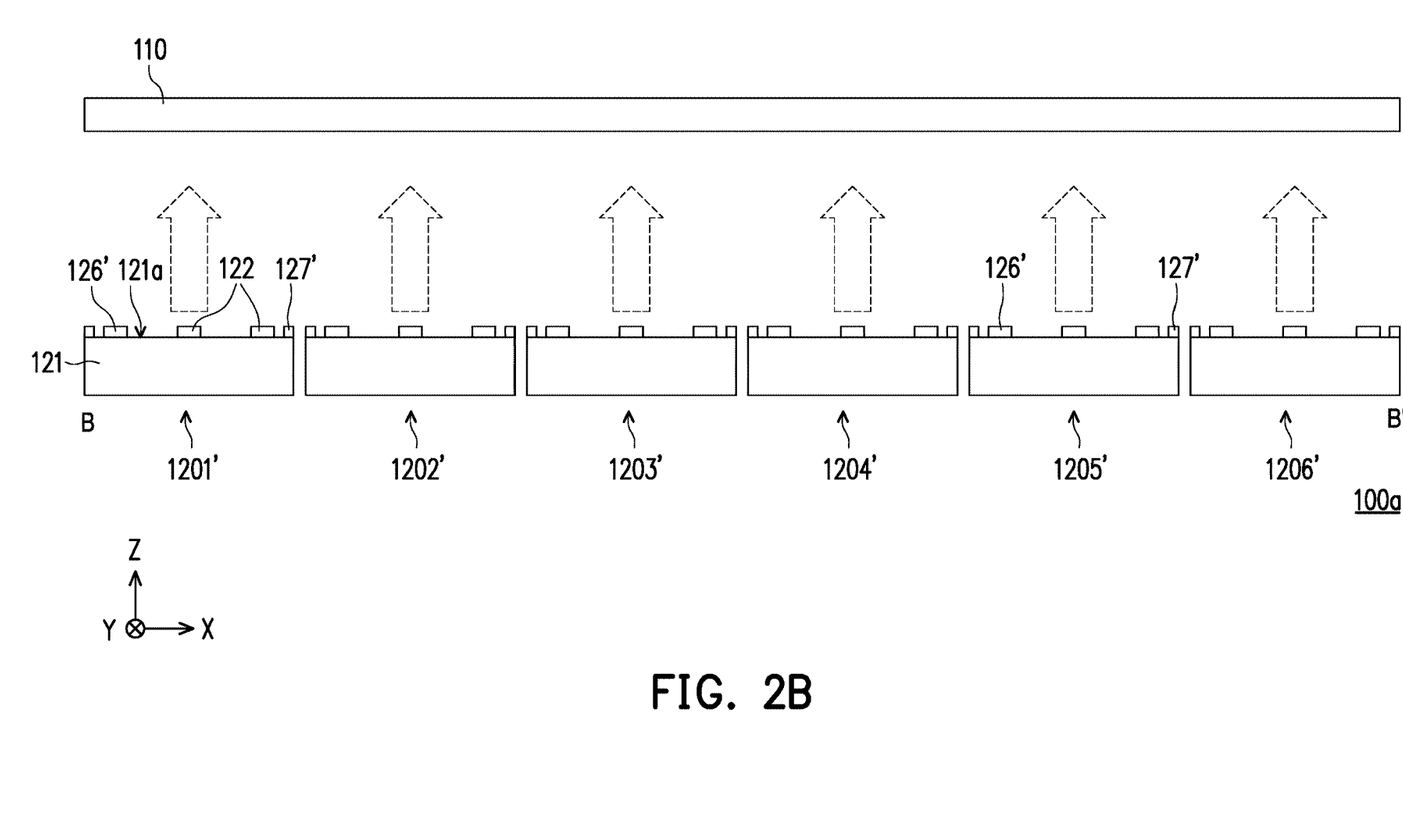
FIG. 2B is a schematic cross-sectional view of the display device of FIG. 2A along a section line B-B'.

FIG. 2A is a schematic top view of a display device according to another embodiment of the disclosure. FIG. 2B is a schematic cross-sectional view of the display device of FIG. 2A along a section line B-B'. Referring to FIG. 1A to FIG. 1B and FIG. 2A to FIG. 2B, a display device 100a of the embodiment is substantially similar to the display device 100 of FIG. 1A to FIG. 1B, and therefore same and similar members in the two embodiments are not repeated herein. The display device 100a of the embodiment is different from the display device 100 mainly in that, in the display device 100a of the embodiment, scanning lines SL of two adjacent backlight units 1201' and 1202' (or backlight units 1202' and 1203', backlight units 1203' and 1204', backlight units 1204' and 1205', or backlight units 1205' and 1206') are not electrically connected.

In detail, referring to both FIG. 2A and FIG. 2B, six backlight units 1201', 1202', 1203', 1204', 1205', 1206' are schematically shown, and the six backlight units 1201', 1202', 1203', 1204', 1205', 1206' are arranged in a 1×6 matrix, and tiled together in a horizontal tiling direction (that is, direction X). The backlight unit 1201' is located at the leftmost side in the matrix, and the backlight unit 1206' is located in the rightmost side in the matrix.

The data driving ICs 125' and the scan driving ICs 126', 127' are respectively disposed on a first surface 121a of a driving substrate 121 of the backlight units 1201', 1202', 1203', 1204', 1205', 1206'. In detail, in the schematic top view (as shown in FIG. 2A) of the embodiment, data driving ICs 125' are disposed on the upper side 120a of the backlight units 1201', 1202', 1203', 1204', 1205', 1206' and are arranged along a direction in which the scanning lines SL extend (that is, a direction X). Scan driving ICs 126' are respectively disposed in each backlight unit, that is, the scan driving ICs 126' are disposed on a left side 120b of the backlight units 1201', 1202', 1203', 1204', 1205', 1206' and arranged along a direction in which the data lines extend, and the scan driving ICs 127' are disposed on a right side 120d of the backlight units 1201', 1202', 1203', 1204', 1205', 1206' and arranged along a direction in which the data lines DL extend.

In the embodiment, because each of the backlight units 1201', 1202', 1203', 1204', 1205', 1206' has the scan driving IC 126' on a left side 120b, and each of the backlight units 1201', 1202', 1203', 1204', 1205', 1206' further has the scan driving IC 127' on a right side 120d, so that each of the backlight units 1201', 1202', 1203', 1204', 1205', 1206' has a voltage provided from the scan driving ICs 126', 127' to turn on a transistor T1 in a driving circuit 123 (as shown in FIG. 1C), so that a transistor T2 in the driving circuit 123 may be turned on by using a data driving signal through the transistor T1 and the light-emitting element 122 is driven to emit light. Therefore, the display device 100a of the embodiment does not need to be connected to scanning lines SL of adjacent backlight units 1201' and 1202' (or backlight units 1202' and 1203', backlight units 1203' and 1204, backlight units 1204' and 1205', or backlight units 1205' and 1206') scanning lines SL by being additionally be provided with a flexible flat cable or a flexible printed circuit board and provide a voltage to backlight units that are not provided with the scan driving ICs 126' and 127'. In addition, because each of the backlight units 1201', 1202', 1203', 1204', 1205', 1206' of the display device 100a of the embodiment has the scan driving IC 126' and the scan driving IC 127', the display device 100a of the embodiment has more uniform overall brightness and better image quality.

For a disposing manner and a signal transmission manner of the scan driving IC 126' and the scan driving IC 127', reference may be made to description of the disposing manner and the signal transmission manner of the scan driving IC 126 and the scan driving IC 127, and the descriptions thereof are omitted herein.

Figure 3:
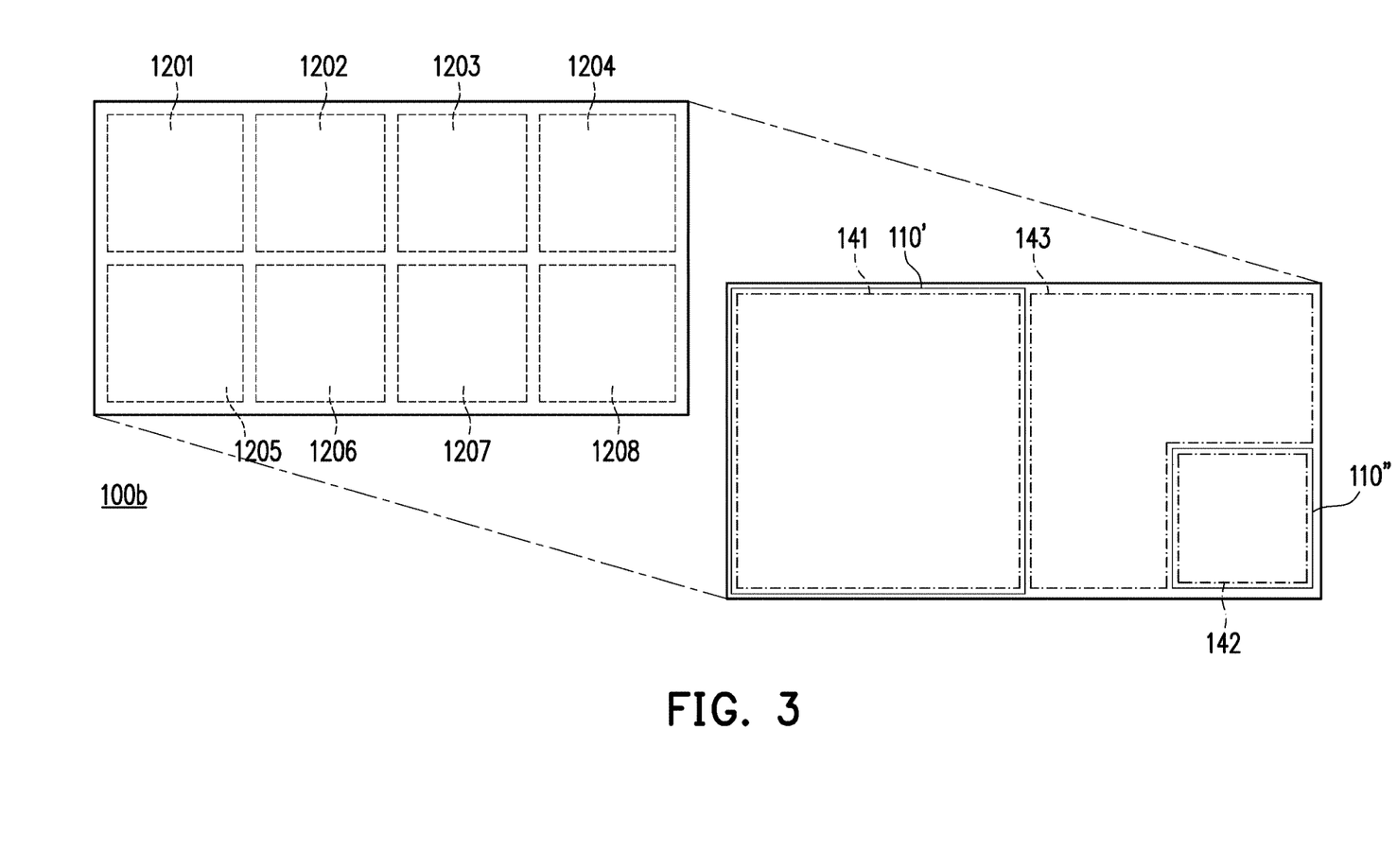
FIG. 3 is a schematic top view of a display device according to another embodiment of the disclosure.

FIG. 3 is a schematic top view of a display device according to another embodiment of the disclosure. Referring to both FIG. 1A and FIG. 3, a display device 100b of the embodiment is substantially similar to the display device 100 of FIG. 1A, and therefore same and similar members in the two embodiments are not repeated herein. The display device 100b of the embodiment is different from the display device 100 mainly in that, in the display device 100b of the embodiment, a liquid crystal panel 110' is disposed on backlight units 1201, 1202, 1205, 1206, and a liquid crystal panel 110" is disposed on a backlight unit 1208.

In detail, the display device 100b of the embodiment may include a first display area 141, a second display area 142, and a third display area 143. The backlight units 1201, 1202, 1205, and 1206 correspond to the first display area 141. The backlight unit 1208 corresponds to the second display area 142. The backlight units 1203, 1204, and 1207 correspond to the third display area 143.

In the embodiment, because the first display area 141 and the second display area 142 need to display high-quality images, the liquid crystal panel 110' is disposed on the backlight units 1201, 1202, 1205, 1206, and the liquid crystal panel 110" is disposed on the backlight unit 1208. In addition, because a text or simple patterns may be arranged in the third display area 143 by using a signal control LED without displaying a high-quality image, it is not necessary to additionally dispose a liquid crystal panel on the backlight units 1203, 1204 and 1207. For example, in order to make the display device 100*b* of the embodiment meets the requirements of a practical application (for example, it is not needed that the high-quality image is displayed in the third display area 143, but the disclosure is not limited thereto), the liquid crystal panel is omitted in the third display area 143, reducing costs for manufacturing the display device 100*b* of embodiment.

In addition, in some embodiments, an LED display panel may be alternatively disposed in the first display area 141 or the second display area 142. For example, a backlight unit and a liquid crystal panel may be disposed in the first display area 141, an LED display panel may be disposed in the second display area 142, and a backlight unit instead of a liquid crystal panel may be disposed in the third display area 143, and different display devices may be selected according to requirements.

Based on the foregoing, in the display device of this embodiment of the disclosure, a plurality of backlight units are tiled together in a horizontal tiling direction and/or a vertical tiling direction, and sizes of the plurality of backlight units after being tiled correspond to a size of the liquid crystal panel and a size of the display device, so that the plurality of backlight units after being tiled may provide light to the liquid crystal panel or the display device. Therefore, compared to that a size of a conventional display device is limited by a size of a single backlight unit, the display device of this embodiment of the disclosure may have a relatively large size, for example, the size may be greater than 70 inches, but is not limited thereto.

Finally, it should be noted that the foregoing embodiments are merely used for describing the technical solutions of the disclosure other than limiting the disclosure. Although the disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the disclosure.

What is claimed is:

1. A display device, comprising:
   a liquid crystal panel;
   a plurality of backlight units configured to provide light to the liquid crystal panel, wherein each of the plurality of backlight units comprises a driving substrate and a light-emitting element disposed on the driving substrate, the driving substrate comprises a data line, a scanning line and a driving circuit having three nodes, and the three nodes of the driving circuit are respectively electrically connected to the data line, the scanning line and the light-emitting element;
   a plurality of first pads disposed on the driving substrate and electrically connected to a plurality of data lines; and
   a plurality of second pads disposed on the driving substrate and electrically connected to a plurality of scanning lines,
   wherein two of the plurality of backlight units are adjacent to each other, and the plurality of first pads or the plurality of second pads of the two of the plurality of backlight units are electrically connected to each other through a flexible flat cable or a flexible printed circuit board, and
   wherein the two of the plurality of backlight units are tiled to each other, and there is a tiling area between the two of the plurality of backlight units.

2. The display device according to claim 1, wherein data lines of the two of the plurality of backlight units are electrically connected to each other.

3. The display device according to claim 2, wherein the data lines of the two of the plurality of backlight units are electrically connected to each other through a flexible flat cable.

4. The display device according to claim 2, wherein the data lines of the two of the plurality of backlight units are electrically connected to each other through a flexible printed circuit board.

5. The display device according to claim 1, wherein scanning lines of the two of the plurality of backlight units are electrically connected to each other.

6. The display device according to claim 5, wherein the scanning lines of the two of the plurality of backlight units are electrically connected to each other through a flexible flat cable.

7. The display device according to claim 5, wherein the scanning lines of the two of the plurality of backlight units are electrically connected to each other through a flexible printed circuit board.

8. The display device according to claim 1, comprising:
   a plurality of data driving ICs disposed on the driving substrate and electrically connected to a plurality of data lines; and
   a plurality of scan driving ICs disposed on the driving substrate and electrically connected to a plurality of scanning lines,
   wherein in a top view of the display device, the plurality of data driving ICs are respectively disposed on at least one of the plurality of backlight units, and are arranged along a direction in which the plurality of scanning lines extend.

9. The display device according to claim 8, wherein in the top view of the display device, the plurality of scan driving ICs are respectively disposed in at least one of the plurality of backlight units, and are arranged along a direction in which the plurality of data lines extend.

10. The display device according to claim 8, wherein in the top view of the display device, the plurality of scan driving ICs are respectively disposed in each of the plurality of backlight units, and are arranged along a direction in which the plurality of data lines extend.

11. The display device according to claim 1, wherein in a top view of the display device, the plurality of first pads are respectively disposed in each of the plurality of backlight units, and are arranged along a direction in which the plurality of scanning lines extend.

12. The display device according to claim 1, wherein in a top view of the display device, the plurality of second pads are respectively disposed in each of the plurality of backlight units, and are arranged along a direction in which the plurality of data lines extend.

13. The display device according to claim 1, wherein the flexible flat cable or the flexible printed circuit board is disposed on a first surface of a driving substrate of one of the two of the plurality of backlight units, and extends along a side surface of the tiling area, a second surface of the driving substrate, a second surface of the other driving substrate of the other one of the two of the plurality of backlight units and the other side surface of the tiling area to a first surface of the other driving substrate.

14. The display device according to claim 1, wherein the flexible flat cable or the flexible printed circuit board is disposed on a first surface of a driving substrate of one of the two of the plurality of backlight units, and extends along a side surface of the tiling area, the other side surface of the tiling area to a first surface of the other driving substrate of the other one of the two of the plurality of backlight units.

15. The display device according to claim 1, wherein the flexible flat cable or the flexible printed circuit board is disposed on a first surface of a driving substrate of one of the two of the plurality of backlight units, and extends across the tiling area to a first surface of the other driving substrate of the other one of the two of the plurality of backlight units.

16. The display device according to claim 1, wherein a distance between adjacent light-emitting elements is greater than or equal to a distance of the tiling area.

17. The display device according to claim 16, wherein the distance of the tiling area is a shortest distance between a midpoint of a first pad or a midpoint of a second pad of one of the two of the plurality of backlight units and a midpoint of a first pad or a midpoint of a second pad of the other one of the two of the plurality of backlight units.

\* \* \* \* \*